US010940940B2

(12) United States Patent
Brot

(10) Patent No.: US 10,940,940 B2
(45) Date of Patent: Mar. 9, 2021

(54) AIRCRAFT FLIGHT CONTROL SYSTEM

(71) Applicant: Airbus Operations SAS, Toulouse (FR)

(72) Inventor: Patrice Brot, Ramonville-St-Agne (FR)

(73) Assignee: AIRBUS OPERATIONS SAS, Toulouse (FR)

(*) Notice: Subject to any disclaimer, the term of this patent is extended or adjusted under 35 U.S.C. 154(b) by 219 days.

(21) Appl. No.: 15/944,281

(22) Filed: Apr. 3, 2018

(65) Prior Publication Data
US 2018/0290730 A1 Oct. 11, 2018

(30) Foreign Application Priority Data

Apr. 7, 2017 (FR) .................................. 1753040

(51) Int. Cl.
*B64C 13/18* (2006.01)
*G05D 1/00* (2006.01)
(Continued)

(52) U.S. Cl.
CPC ............. *B64C 13/18* (2013.01); *G05B 19/02* (2013.01); *G05D 1/0077* (2013.01); *B64C 13/50* (2013.01)

(58) Field of Classification Search
CPC ...... B64C 13/18; B64C 13/50; G05D 1/0077; G05B 19/02; G05B 19/04
See application file for complete search history.

(56) References Cited

U.S. PATENT DOCUMENTS 3,786,505 A * 1/1974 Rennie .................. G01C 23/00
342/33
5,233,542 A * 8/1993 Hohner ..................... G05B 9/03
700/79
(Continued)

FOREIGN PATENT DOCUMENTS

EP 2717108 A1 * 4/2014 ........... G05D 1/0077
FR 2996651 4/2014
JP 5170052 B2 * 3/2013 ........... G05D 1/0077

OTHER PUBLICATIONS

French Search Report, dated Dec. 13, 2017, priority document.
"AIRBUS state of the art and practices on FDI and FTC in flight control system" Philippe Goupil, Apr. 17, 2011.

*Primary Examiner* — Behrang Badii
*Assistant Examiner* — Jalal C Coduroglu
(74) *Attorney, Agent, or Firm* — Greer, Burns & Crain, Ltd.

(57) ABSTRACT

An aircraft flight control system comprises a set of primary computers, each configured to compute a flight order dependent on at least one aircraft flight parameter and intended for an aircraft control surface actuator remote controller. Each computer participates in command mode within a first virtual command/monitor pair and in monitor mode within a second virtual command/monitor pair. Each computer determines a consolidated flight parameter value as a function of a flight parameter value acquired by this computer and of flight parameter values received from the other computers, using a consolidation algorithm commonly used by all primary computers to each determine a consolidated flight parameter value, and compute the intended flight order for the remote controller as a function of the consolidated flight parameter value, according to a unique computation whose result is used by the computer both when acting in command mode and when acting in monitor mode.

14 Claims, 2 Drawing Sheets

(51) Int. Cl.
*G05B 19/02* (2006.01)
*B64C 13/50* (2006.01)

(56) References Cited

U.S. PATENT DOCUMENTS

| | | | | |
|---|---|---|---|---|
| 5,493,497 A * | 2/1996 | Buus | ................. | G05D 1/0077 |
| | | | | 701/4 |
| 5,515,282 A * | 5/1996 | Jackson | ............. | G05D 1/0077 |
| | | | | 700/4 |
| 5,797,564 A * | 8/1998 | Cartmell | ................ | B64C 13/22 |
| | | | | 244/223 |
| 5,881,971 A * | 3/1999 | Hickman | ............. | G05D 1/0055 |
| | | | | 244/1 R |
| 6,850,252 B1 * | 2/2005 | Hoffberg | ............ | G06K 9/00369 |
| | | | | 348/E7.061 |
| 7,209,809 B2 * | 4/2007 | Yeh | ...................... | B64C 13/505 |
| | | | | 701/3 |
| 7,946,528 B2 * | 5/2011 | Yoeli | ..................... | B64C 27/20 |
| | | | | 244/76 R |
| 8,209,577 B2 * | 6/2012 | Huang | ................ | H03M 13/373 |
| | | | | 714/752 |
| 8,386,093 B2 * | 2/2013 | Lin | ........................ | B64C 19/00 |
| | | | | 701/3 |
| 8,538,602 B2 * | 9/2013 | Brot | ..................... | G05D 1/0077 |
| | | | | 701/3 |
| 8,600,584 B2 * | 12/2013 | Fervel | .................. | B64C 13/505 |
| | | | | 701/3 |
| 9,008,865 B2 * | 4/2015 | Joseph | .................. | G05B 15/02 |
| | | | | 701/3 |
| 9,168,995 B2 * | 10/2015 | Brot | ..................... | G05D 1/0077 |
| 2007/0050101 A1 * | 3/2007 | Sacle | ................ | B64D 45/0031 |
| | | | | 701/11 |
| 2010/0204853 A1 * | 8/2010 | Sghairi | ................ | B64C 13/505 |
| | | | | 701/4 |
| 2010/0222943 A1 * | 9/2010 | Sghairi | ................ | B64C 13/503 |
| | | | | 701/4 |
| 2011/0118906 A1 * | 5/2011 | Fervel | .................. | B64C 13/503 |
| | | | | 701/3 |
| 2011/0174920 A1 * | 7/2011 | Yoeli | ..................... | B64C 27/20 |
| | | | | 244/75.1 |
| 2011/0276199 A1 * | 11/2011 | Brot | ..................... | G05D 1/0077 |
| | | | | 701/3 |
| 2012/0069131 A1 * | 3/2012 | Abelow | ............... | G06Q 10/067 |
| | | | | 348/14.01 |
| 2012/0101663 A1 * | 4/2012 | Fervel | .................... | G05B 9/03 |
| | | | | 701/3 |
| 2014/0100718 A1 * | 4/2014 | Brot | ..................... | G05D 1/0077 |
| | | | | 701/3 |
| 2017/0235848 A1 * | 8/2017 | Van Dusen | ........... | G06F 16/904 |
| | | | | 705/12 |
| 2017/0269594 A1 * | 9/2017 | Sydnor | ................ | B64C 39/024 |
| 2018/0180444 A1 * | 6/2018 | Cantaloube | ........... | G06F 3/0488 |
| 2018/0290730 A1 * | 10/2018 | Brot | ....................... | G05B 19/02 |

* cited by examiner

AIRCRAFT FLIGHT CONTROL SYSTEM

CROSS-REFERENCES TO RELATED APPLICATIONS

This application claims the benefit of the French patent application No. 1753040 filed on Apr. 7, 2017, the entire disclosures of which are incorporated herein by way of reference.

BACKGROUND OF THE INVENTION

The invention relates to a system of flight commands of an aircraft, designed to operate control surfaces of the aircraft. Modern aircraft, transport airplanes, comprise a set of flight control computers which compute orders, called flight orders in the subsequent description, that they transmit to controllers of actuators of control surfaces of the aircraft. These control surfaces are, for example, flaps or ailerons situated at the level of the wings of the aircraft, elevators situated, for example, on a tailplane at the rear of the aircraft, a rudder situated on the fin, etc. The flight control computers are dissimilar and redundant in such a way that the flight control system is robust to faults that may affect certain computers. Moreover, generally, some of the computers are used in command mode (COM) and the other computers are used in monitor mode (MON), a computer in monitor mode surveilling the operation of a computer in command mode. The computers are thus distributed according to COM/MON pairs. Document U.S. Pat. No. 9,168,995 B2 describes a flight control system comprising primary flight control computers, in which each primary computer participates, on the one hand, in command mode within a first virtual command/monitor pair consisting of the computer and of a first of the other primary computers acting in monitor mode on behalf of the first virtual command/monitor pair and, on the other hand, in monitor mode within a second virtual command/monitor pair consisting of the computer and of a second of the other primary computers acting in command mode on behalf of the second virtual command/monitor pair. This flight control system exhibits the advantage of requiring only a reduced number of primary flight control computers. The computation of a flight order is generally carried out as a function of at least one flight parameter of the aircraft. Such a flight parameter of the aircraft can be either of Boolean type, for example corresponding to an automatic piloting mode, to a flight phase of the aircraft or to a type of flight control law, or of numerical type, for example corresponding to a speed of the aircraft. Each primary computer carries out the acquisition of the at least one flight parameter on the basis of other computers of the aircraft or on the basis of sensors of the aircraft. The COM and MON computers of one and the same COM/MON pair acquire the at least one flight parameter in an asynchronous manner and they would risk computing different flight orders if each computed the flight order as a function of the flight parameter that it has acquired. To avoid such a problem, the COM and MON computers must compute a flight order on the basis of one and the same value of the at least one flight parameter, so that the MON computer does not detect an anomaly of the flight order during a change of value of the at least one flight parameter. Accordingly, the COM and MON computers of one and the same COM/MON pair mutually exchange the values of the at least one flight parameter that they have acquired and they compute a consolidated value of the flight parameter, on the basis of which value they compute the flight order. In so far as a primary computer participates in two COM/MON pairs as indicated previously, it must compute a consolidated value of the at least one flight parameter, and then a value of the flight order, for each of the two pairs in which it participates. This requires that the computation of the consolidated value of the flight parameter and the computation of the flight order be performed twice by each primary computer. This gives rise to a very expensive computational overload since it makes it necessary to increase the computational capacities of the primary computers. It would therefore be opportune if the computation of the consolidated value of the flight parameter and the computation of the flight order could be performed just once.

SUMMARY OF THE INVENTION

An aim of the present invention is, in particular, to afford a solution to these problems. It relates to a flight control system of an aircraft comprising a set of at least four primary computers for the computation of flight commands of the aircraft, linked together by a communication network, in which each of the at least four primary computers is configured to compute a flight order intended for a remote controller of a control surface actuator of the aircraft, each of the primary computers participating:
  in command mode within a first virtual command/monitor pair consisting of the computer and of a first of the other primary computers acting in monitor mode on behalf of the first virtual command/monitor pair; and
  in monitor mode within a second virtual command/monitor pair consisting of the computer and of a second of the other primary computers acting in command mode on behalf of the second virtual command/monitor pair,
  in which the flight order is computed as a function of at least one flight parameter of the aircraft.

The flight control system is noteworthy in that each of the at least four primary computers is configured to:
  acquire a value of the at least one flight parameter of the aircraft, transmit this value to the other primary computers and receive values of the at least one flight parameter of the aircraft which are transmitted by the other primary computers;
  determine a consolidated value of the at least one flight parameter of the aircraft as a function of the acquired value of the at least one flight parameter of the aircraft and of the values of the at least one flight parameter of the aircraft which are received from the other primary computers, by using a common consolidation algorithm also used by the other primary computers to each determine a consolidated value of the at least one flight parameter of the aircraft;
  compute the flight order intended for the remote controller, by means of a computation law, as a function of the consolidated value of the at least one flight parameter of the aircraft, according to a unique computation whose result is used by the computer, both when it acts in command mode within the first virtual command/monitor pair, and also when it acts in monitor mode within the second virtual command/monitor pair.

Thus, the various primary computers of the flight control system mutually exchange the values of the at least one flight parameter that they acquire. Given that the various primary computers each determine a consolidated value of the at least one flight parameter by means of a consolidation algorithm common to these various primary computers, they all obtain the same consolidated value of the flight parameter. Consequently, the primary computer participating in two COM/MON pairs (with, on the one hand, the first and, on the other hand, the second of the other primary computers) can use the same consolidated value of the flight parameter for each of the two COM/MON pairs in which it participates, since the first and the second of the other primary computers also use this same consolidated value. It follows from this that the primary computer can make a unique computation of the flight order on the basis of the consolidated value of the flight parameter and use the result of the unique computation for each of the COM/MON pairs in which it participates. This allows a very significant reduction in the computational load of each of the primary computers.

In a preferred embodiment, the primary computers are of at least two types, a first type of primary computers implementing software of a first type to implement the flight order computation law and, a second type of primary computers implementing software of a second type to implement the flight order computation law, the software of the first type and the software of the second type being dissimilar In a first embodiment, the at least one flight parameter of the aircraft is a parameter of Boolean type such that a change of the consolidated value of the at least one flight parameter of the aircraft corresponds to a transition of the flight order computation law.

In an advantageous manner, the common consolidation algorithm used by the primary computers to determine the consolidated value of the at least one flight parameter of Boolean type is configured so as to determine a consolidated value of the at least one flight parameter corresponding to a transition of the flight order computation law, when at least half the values of the at least one flight parameter of the aircraft that are used for consolidation, on the one hand, correspond to a transition of the flight order computation law and, on the other hand, originate from at least one computer of the first type and from at least one computer of the second type.

In a particular manner, a value of the at least one flight parameter corresponds to a transition of the flight order computation law when this value is equal to "TRUE," the number of primary computers is equal to four primary computers distributed as two primary computers of the first type and two primary computers of the second type and, the common consolidation algorithm used by the primary computers to determine the consolidated value of the at least one flight parameter of Boolean type is configured so as to determine the consolidated value of the at least one flight parameter by using the following formula:

$$V\text{con}=(V1A \text{ OR } V4A) \text{AND} (V2B \text{ OR } V3C)$$

in which:

Vcon is the consolidated value of the at least one flight parameter,

V1A and V4A are the values of the at least one flight parameter originating respectively from the two primary computers of the first type; and V2B and V3B are the values of the at least one flight parameter originating respectively from the two primary computers of the second type.

In a second embodiment, the at least one flight parameter of the aircraft is a parameter of numerical type and each of the at least four primary computers is configured to determine whether the consolidated value of the at least one flight parameter is valid and to degrade the level of the computation law if the consolidated value of the at least one flight parameter is not valid. In particular, the consolidated value of the at least one flight parameter is considered valid if it is consistent with values of the at least one flight parameter originating from the various primary computers.

In an advantageous manner, the number of primary computers is equal to four primary computers distributed as two primary computers of the first type and two primary computers of the second type and, each of the four primary computers is configured to determine that the consolidated value of the at least one flight parameter is valid when the consolidated value of the at least one flight parameter is consistent with at least one of the values of the at least one flight parameter originating from the primary computers of the first type and with at least one of the values of the at least one flight parameter originating from the primary computers of the second type.

In a third embodiment, the at least one flight parameter of the aircraft is a parameter of numerical type representative of a mode of operation of an automatic pilot of the aircraft, this parameter of numerical type being able to take a finite number of predetermined values, each associated with a mode of operation of the automatic pilot of the aircraft.

In an advantageous manner, the common consolidation algorithm used by the primary computers to determine the consolidated value of the at least one flight parameter is configured so as to determine a consolidated value of the at least one flight parameter corresponding to a value predominantly present among the values of the at least one flight parameter originating from the various primary computers, if this value corresponds to at least one of the values of the at least one flight parameter originating from the primary computers of the first type and to at least one of the values of the at least one flight parameter originating from the primary computers of the second type.

The invention also relates to an aircraft comprising a flight control system such as aforementioned.

BRIEF DESCRIPTION OF THE DRAWINGS

The invention will be better understood on reading the description which follows and on examining the appended figures.

DETAILED DESCRIPTION OF THE PREFERRED EMBODIMENTS

Figure 1:
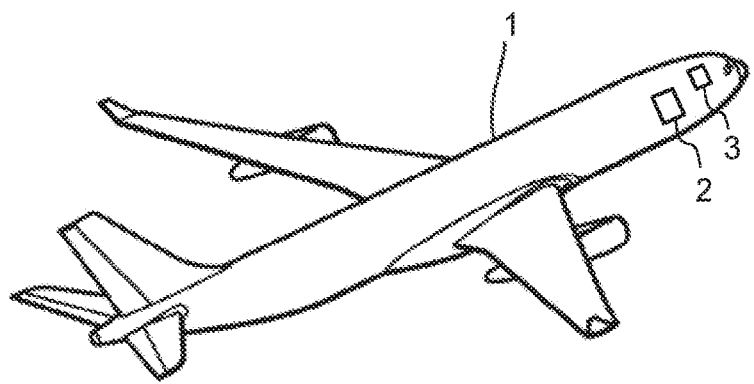
FIG. 1 illustrates in a simplified manner an aircraft comprising a cockpit.
Figure 2:
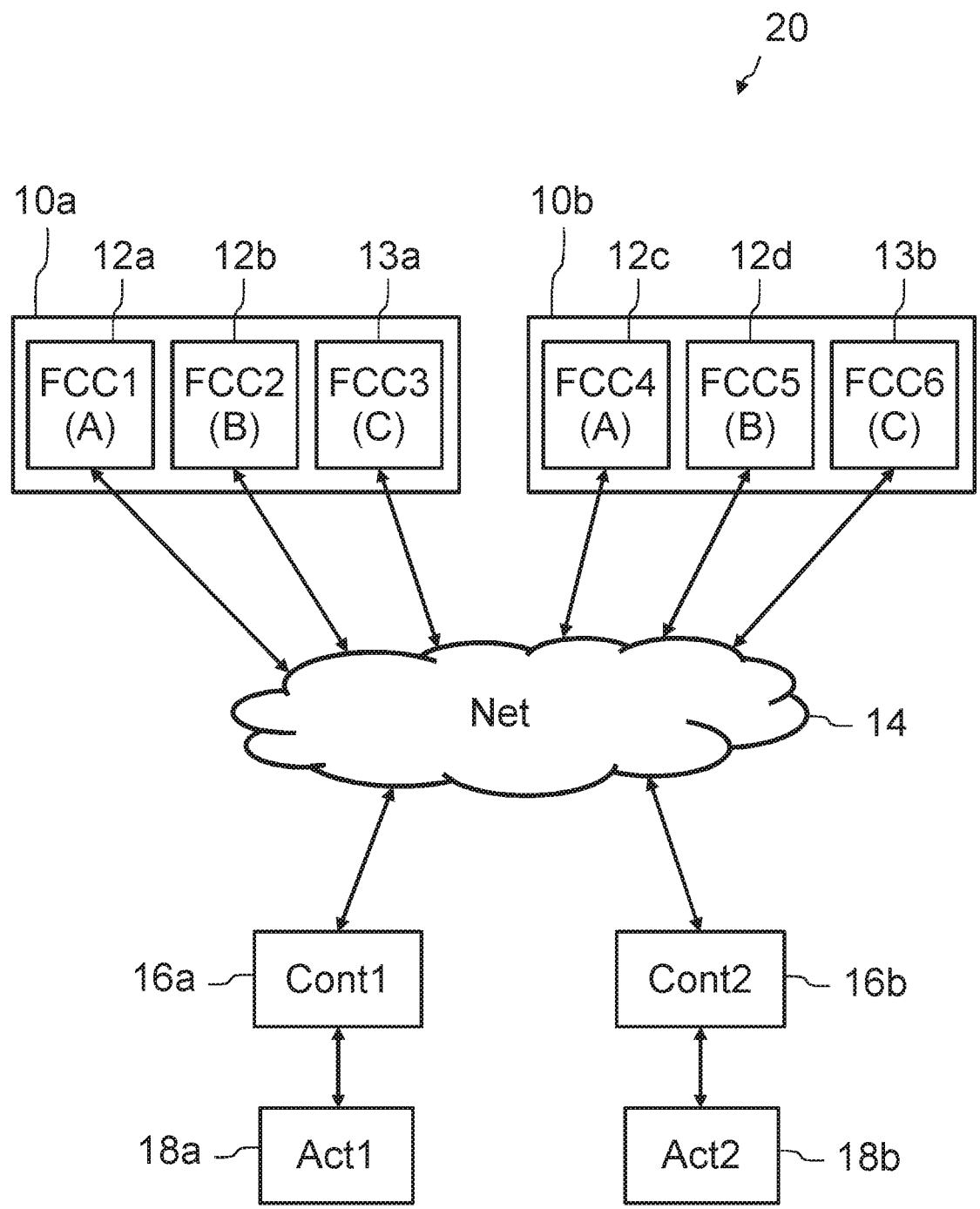
FIG. 2 illustrates in a schematic manner an embodiment, in accordance with the invention, of a flight control system of an aircraft.

The aircraft 1 represented in FIG. 1 comprises a flight control system 20 such as represented in FIG. 2. This flight control system comprises a set of primary computers 12a, 12b, 12c, 12d for the computation of flight commands of the aircraft. In an advantageous manner, the flight control system furthermore comprises two secondary computers 13a, 13b for the computation of flight commands. The various computers are labelled FCC1 to FCC6 in the figure, for "Flight Control Computer." They are, for example, situated in an avionics bay 2 of the aircraft. The computers are distributed in two groups 10a (comprising the primary computers 12a, 12b and the secondary computer 13a) and 10b (comprising the primary computers 12c, 12d and the secondary computer 13b). The two groups 10a and 10b are sited at different locations, for example situated on either side of a longitudinal axis of the aircraft, so as to avoid common faults. The various computers are linked to a communication network 14 of the aircraft (labelled "Net" in the figure). The flight control system 20 also comprises controllers 16a, 16b (labelled "Cont1," "Cont2" in the figure) of actuators 18a, 18b (labelled "Act1," "Act2" in the figure). These actuators are, in particular, actuators of control surfaces of the aircraft. The actuator controllers are also linked to the communication network 14.

In operation, the primary computers 12a, 12b, 12c, 12d receive piloting settings originating from piloting members actuated by a pilot in a cockpit 3 of the aircraft or from an automatic piloting system of the aircraft. The role of the computers is to compute commands, called flight orders, to be dispatched to the controllers 16a, 16b of the actuators 18a, 18b on the basis of the information received from the piloting members (or from the automatic piloting system) and current flight parameters. This computation obeys a law from among a set of possible laws. By default, the computation is performed according to a law called a normal law. The other laws are implemented to cope with a degradation of the available information, for example in case of loss of certain flight parameters subsequent to possible faults of the apparatuses providing these parameters. A succession of laws are therefore implemented to alleviate an increasingly significant degradation of the available parameters. As last resort, a so-called direct law transmits the settings obtained from the piloting members directly to the actuators, the piloting then being controlled entirely by the pilot without modification. The secondary computers 13a, 13b ensure the control of the actuators when the primary computers are no longer operational. Each computer executes software whose type is symbolized by a letter between parentheses in the figure. The primary computers 12a and 12c, of a first type, execute a first software, named "A," which implements the set of the available laws. The primary computers 12b and 12d, of a second type, execute a second software, named "B," which also implements the set of available laws. The secondary computers 13a and 13b execute a third software, named "C" which implements only the direct law. The fact that the computers are of several dissimilar software types allows the flight control system to be robust to a common fault of software origin.

The four primary computers 12a, 12b, 12c, 12d represented in the figure are organized so as to form four command/monitor pairs. These four pairs are, for example, the pairs (FCC1, FCC5), (FCC2, FCC1), (FCC4, FCC2) and (FCC5, FCC4). The first computer of the pair acts in command mode and the second in monitor mode. Each primary computer participates in two pairs, once in the guise of control unit and once in the guise of monitoring unit. In an advantageous manner, the control and monitoring units of each pair execute dissimilar software. The secondary computers form a particular command/monitor pair: the pair (FCC3, FCC6). Each computer pair can be seen as a virtual command/monitor duplex computer. These pairs are given by way of examples, other pairs can be formed by permutation and as a function of the number of computers implemented in a particular solution.

Each pair advantageously has a validity state computed by each computer of the pair. According to the exemplary embodiment, a computer of the pair determines the validity of this pair according to the following criteria:

The other computer is perceived as valid.

The two computers implement different software.

The flight orders computed by the two computers are available and computed according to the same flight law.

The difference in absolute value between the two computed flight orders is less than a tolerance threshold.

In accordance with an embodiment of the invention, the four primary computers 12a, 12b, 12c, 12d each carry out the acquisition of a value of at least one flight parameter of the aircraft necessary for the computation of a flight order. Each of the primary computers transmits this value of the at least one flight parameter, to the other primary computers. Thus, each primary computer has at one and the same time the value of the at least one flight parameter that it has itself acquired, as well as values of the at least one flight parameter that were acquired by the other three primary computers. Each primary computer determines a consolidated value of the at least one flight parameter of the aircraft as a function of the value of the at least one flight parameter that it has itself acquired, as well as values of the at least one flight parameter that were acquired by the other three primary computers. The various primary computers 12a, 12b, 12c, 12d use one and the same consolidation algorithm to each compute a consolidated value of the at least one flight parameter. The consolidated values computed by the various primary computers are thus computed by means of the same consolidation algorithm: these values ought therefore to be similar. Each of the primary computers thereafter computes the flight order, by means of a computation law, as a function of the consolidated value of the at least one flight parameter of the aircraft. Given that the flight orders computed by the various primary computers are computed as a function of similar consolidated values for the various primary computers, the flight orders computed by the various computers are themselves presumed to be similar. Consequently, each primary computer carries out a unique computation of the flight order, whose result is used both when it acts in command mode within the first virtual command/monitor pair and also when it acts in monitor mode within the second virtual command/monitor pair. It is no longer necessary, as in the aforementioned prior art, to carry out a first computation based on a first consolidated value of the flight parameter (when the primary computer acts in command mode within the first virtual command/monitor pair) and a second computation based on a second consolidated value of the flight parameter (when the primary computer acts in monitor mode within the second virtual command/monitor pair). This is particularly advantageous since this results in a significant reduction in the computational load of the various primary computers.

In a first embodiment, the at least one flight parameter of the aircraft is a parameter of Boolean type such that a change of the consolidated value of the at least one flight parameter of the aircraft corresponds to a transition of the flight order computation law. This flight parameter corresponds, for example, to a flight phase of the aircraft (such as rolling on the ground, takeoff, climb flight, cruising flight, descent flight, landing, etc.). During the landing, a flight parameter of Boolean type corresponds, for example, to a condition of engagement of a piloting law making it possible to fly a flare phase of the trajectory of the aircraft. A switch from a value FALSE to a value TRUE of the flight parameter corresponds to a transition of the flight order computation law, from a law of descent to the landing runway, to the law making it possible to fly a flare phase.

In an advantageous manner, the common consolidation algorithm used by the primary computers to determine the consolidated value of the at least one flight parameter of Boolean type is configured so as to determine a consolidated value of the at least one flight parameter corresponding to a transition of the flight order computation law, when at least half the values of the at least one flight parameter of the aircraft that are used for consolidation, on the one hand, correspond to a transition of the flight order computation law and, on the other hand, originate from at least one computer of the first type (executing software of type A) and from at least one computer of the second type (executing software of type B). In a particular exemplary embodiment, a value of the at least one flight parameter corresponds to a transition of the flight order computation law when this value is equal to "TRUE." The common consolidation algorithm used by the primary computers to determine the consolidated value of the at least one flight parameter of Boolean type is then configured so as to determine the consolidated value of the at least one flight parameter by using for example the following formula:

$$V\text{con}=(V1A \text{ OR } V4A)\text{AND}(V2B \text{ OR } V3C)$$

in which:

Vcon is the consolidated value of the at least one flight parameter,

V1A and V4A are the values of the at least one flight parameter originating respectively from the two primary computers 12a and 12c of the first type; and V2B and V3B are the values of the at least one flight parameter originating respectively from the two primary computers 12b and 12d of the second type.

The value of Vcon is TRUE when at least one of the values V1A or V4A (originating from the computers 12a, 12c of the first type) is TRUE and, at least one of the values V2B or V3B (originating from the computers 12b, 12d of the second type) is TRUE.

Other formulae can be used for the computation of the consolidated value, for example:

$$V\text{con}=(V1A \text{ OR } V4A)\text{OR}(V2B \text{ OR } V3C)$$

or else:

$$V\text{con}=(V1A \text{ AND } V4A)\text{OR}(V2B \text{ AND } V3C)$$

The values of the at least one flight parameter originating from one or more other primary computers may sometimes not be available to the primary computer considered, for example because of faults of the other primary computers or because of a problem of communication between the computers. In such cases, according to a first alternative, these values of the at least one flight parameter are considered equal to FALSE for the computation of the consolidated value. According to a second alternative, these values of the at least one flight parameter are considered equal to TRUE.

In an advantageous manner, when only two values of the at least one flight parameter are available for the computation of the consolidated value, then the consolidated value is equal to TRUE if these two values are equal to TRUE, whatever the software type of the primary computers that carried out the acquisition of the values. The fact of not taking account of the software type of the computers makes it possible to improve the availability of the consolidated value. When fewer than two values of the at least one flight parameter are available, the primary computer does not compute the consolidated value and it uses a degraded law for the computation of the flight order.

In a second embodiment, the at least one flight parameter of the aircraft is a parameter of numerical type, for example a speed of the aircraft, an altitude of the aircraft, etc. Each of the primary computers 12a, 12b, 12c, 12d determines a consolidated value of the at least one flight parameter. In an exemplary embodiment, the algorithm used by a primary computer to determine this consolidated value is the following:

if 4 values of the at least one flight parameter that arise from the various computers are available for this computer, then the consolidated value corresponds to the second, in increasing order, of the 4 values;

if 3 values of the at least one flight parameter that arise from the various computers are available for this computer, then the consolidated value corresponds to the median value of the 3 values;

if 2 values of the at least one flight parameter that arise from the various computers are available for this computer, then the consolidated value corresponds to the average value of the 2 values;

if fewer than 2 values of the at least one flight parameter that arise from the various computers are available for this computer, then the primary computer does not determine the consolidated value and it uses a degraded law for the computation of the flight order.

Each of the primary computers 12a, 12b, 12c, 12d furthermore determines whether the consolidated value thus determined is valid, that is to say, whether it is consistent with the values of the at least one flight parameter originating from the various primary computers. The primary computer uses a degraded law for the computation of the flight order if the consolidated value of the at least one flight parameter is not valid. In a particular manner, the consolidated value is determined as consistent with a value of the flight parameter if a distance between the consolidated value and this value of the flight parameter is less than a predetermined threshold during a determined time interval. In an advantageous manner, the consolidated value of the at least one flight parameter is determined as valid when the consolidated value of the at least one flight parameter is consistent with at least one of the values of the at least one flight parameter originating from the primary computers 12a, 12c of the first type and with at least one of the values of the at least one flight parameter originating from the primary computers 12b, 12d of the second type. In a particular manner, when only two values of the at least one flight parameter that arise from the various computers are available for this computer, then the consolidated value of the at least one flight parameter is determined as valid when it is consistent with these two values, whatever the software type of the primary computers that carried out the acquisition of the values. The fact of not taking account of the software type of the computers makes it possible to improve the availability of the consolidated value.

In a third embodiment, the at least one flight parameter of the aircraft is a parameter of numerical type representative of a mode of operation of an automatic pilot of the aircraft. This parameter of numerical type is able to take a finite number of predetermined values each associated with a mode of operation of the automatic pilot of the aircraft. The current mode of operation of the automatic pilot corresponds in particular to a mode termed "engaged" of the automatic pilot, whose value is for example provided by an FCU ("Flight Control Unit") system of the cockpit of the aircraft.

In an advantageous manner, the common consolidation algorithm used by the primary computers to determine the consolidated value of the at least one flight parameter determines a consolidated value of the at least one flight parameter corresponding to a value predominantly present among the values of the at least one flight parameter originating from the various primary computers, if this value corresponds to at least one of the values of the at least one flight parameter originating from the primary computers of the first type and to at least one of the values of the at least one flight parameter originating from the primary computers of the second type. When there does not exist a value predominantly present among the values of the at least one flight parameter, but several values represented equally, then the consolidated value corresponds to that one of the values represented equally which is representative of a highest priority mode of operation of the automatic pilot, an order of priority being associated with each of the various modes of operation of the automatic pilot.

When the consolidated value corresponds to a different mode of operation of the automatic pilot from the current engaged mode, then the primary computer chooses this mode of operation as new engaged mode of the automatic pilot, and then it computes the flight orders of the actuators 18a, 18b as a function of the new engaged mode of the automatic pilot.

In a particular embodiment, when the values arising from at least 3 primary computers are available to determine the consolidated value, if the value determined does not correspond to at least one of the values of the at least one flight parameter originating from the primary computers of the first type and to at least one of the values of the at least one flight parameter originating from the primary computers of the second type, then the primary computer keeps the current engaged mode of the automatic pilot unchanged.

The flight control system 20 has been described in the particular case of the example represented in FIG. 2, comprising 4 primary computers. This example is not limiting of the invention. Indeed, according to other embodiments in accordance with the invention, the flight control system can comprise a higher number of primary computers, for example 6 or 8 primary computers. The latter then operate, for example, according to the same principles as those used for the 4 computers 12a, 12b, 12c, 12d of the system described previously. In the case of a system comprising 6 primary computers, the latter can be of two or three different software types. In the case of a system comprising 8 primary computers, the latter can be of two, three or four different software types.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control system of an aircraft comprising a set of at least four primary computers for the computation of flight commands of the aircraft, linked together by a communication network, in which each of the at least four primary computers is configured to compute a flight order intended for a remote controller of a control surface actuator of the aircraft, each of the primary computers participating:

in command mode within a first virtual command/monitor pair consisting of the computer and of a first of the other primary computers acting in monitor mode on behalf of the first virtual command/monitor pair; and in monitor mode within a second virtual command/monitor pair consisting of the computer and of a second of the other primary computers acting in command mode on behalf of the second virtual command/monitor pair, in which the flight order is computed by each of the at least four primary computers as a function of at least one flight parameter of the aircraft, wherein each of the at least four primary computers is configured to:

acquire a value of the at least one flight parameter of the aircraft, transmit this value to the other primary computers and receive values of the at least one flight parameter of the aircraft which are transmitted by the other primary computers;

determine a consolidated value of the at least one flight parameter of the aircraft as a function of the acquired value of the at least one flight parameter of the aircraft and of the values of the at least one flight parameter of the aircraft which are received from the other primary computers, by using a common consolidation algorithm also used by the other primary computers to each determine a consolidated value of the at least one flight parameter of the aircraft; and compute the flight order intended for the remote controller, by means of a computation law, as a function of the consolidated value of the at least one flight parameter of the aircraft, according to a single computation whose result is used by the computer both when it acts in command mode within the first virtual command/monitor pair and also when it acts in monitor mode within the second virtual command/monitor pair.

2. The system according to claim 1, wherein the primary computers are of at least two types, a first type of primary computers implementing software of a first type to implement the flight order computation law and, a second type of primary computers implementing software of a second type to implement the flight order computation law, the software of the first type and the software of the second type being dissimilar.

3. The system according to claim 2, wherein the at least one flight parameter of the aircraft is a parameter of Boolean type such that a change of the consolidated value of the at least one flight parameter of the aircraft corresponds to a transition of the flight order computation law.

4. The system according to claim 3, wherein the common consolidation algorithm used by the primary computers to determine the consolidated value of the at least one flight parameter of Boolean type is configured so as to determine a consolidated value of the at least one flight parameter corresponding to a transition of the flight order computation law, when at least half the values of the at least one flight parameter of the aircraft that are used for consolidation, correspond to a transition of the flight order computation law and originate from at least one computer of the first type and from at least one computer of the second type.

5. The system according to claim 4, wherein a value of the at least one flight parameter corresponds to a transition of the flight order computation law when this value is equal to "TRUE," in that the number of primary computers is equal to four primary computers distributed as two primary computers of the first type and two primary computers of the second type and, wherein the common consolidation algorithm used by the primary computers to determine the consolidated value of the at least one flight parameter of Boolean type is configured so as to determine the consolidated value of the at least one flight parameter by using the following formula:

$$V\text{con} = (V1A \text{ OR } V4A) \text{ AND } (V2B \text{ OR } V3C)$$

in which:

Vcon is the consolidated value of the at least one flight parameter,

V1A and V4A are the values of the at least one flight parameter originating respectively from the two primary computers of the first type; and V2B and V3B are the values of the at least one flight parameter originating respectively from the two primary computers of the second type.

6. The system according to claim 2, wherein the at least one flight parameter of the aircraft is a parameter of numerical type and each of the at least four primary computers is configured to determine whether the consolidated value of the at least one flight parameter is valid and to degrade the level of the computation law if the consolidated value of the at least one flight parameter is not valid.

7. The system according to claim 6, wherein the number of primary computers is equal to four primary computers distributed as two primary computers of the first type and two primary computers of the second type and, wherein each of the four primary computers is configured to determine that the consolidated value of the at least one flight parameter is valid when the consolidated value of the at least one flight parameter is consistent with at least one of the values of the at least one flight parameter originating from the primary computers of the first type and with at least one of the values of the at least one flight parameter originating from the primary computers of the second type.

8. The system according to claim 2, wherein the at least one flight parameter of the aircraft is a parameter of numerical type representative of a mode of operation of an automatic pilot of the aircraft, this parameter of numerical type being able to take a finite number of predetermined values each associated with a mode of operation of the automatic pilot of the aircraft.

9. The system according to claim 8, wherein the common consolidation algorithm used by the primary computers to determine the consolidated value of the at least one flight parameter is configured so as to determine a consolidated value of the at least one flight parameter corresponding to a value predominantly present among the values of the at least one flight parameter originating from the various primary computers, if this value corresponds to at least one of the values of the at least one flight parameter originating from the primary computers of the first type and to at least one of the values of the at least one flight parameter originating from the primary computers of the second type.

10. An aircraft comprising a flight control system according to claim 1.

11. A flight control system of an aircraft comprising a set of at least four primary computers for the computation of flight commands of the aircraft, linked together by a communication network, in which each of the at least four primary computers is configured to compute a flight order intended for a remote controller of a control surface actuator of the aircraft, each of the primary computers participating:

in command mode within a first virtual command/monitor pair consisting of the computer and of a first of the other primary computers acting in monitor mode on behalf of the first virtual command/monitor pair; and in monitor mode within a second virtual command/monitor pair consisting of the computer and of a second of the other primary computers acting in command mode on behalf of the second virtual command/monitor pair, in which the flight order is computed by each of the at least four primary computers as a function of at least one flight parameter of the aircraft, wherein each of the at least four primary computers is configured to:

acquire a value of the at least one flight parameter of the aircraft, transmit this value to the other primary computers and receive values of the at least one flight parameter of the aircraft which are transmitted by the other primary computers;

determine a consolidated value of the at least one flight parameter of the aircraft as a function of the acquired value of the at least one flight parameter of the aircraft and of the values of the at least one flight parameter of the aircraft which are received from the other primary computers, by using a common consolidation algorithm also used by the other primary computers to each determine a consolidated value of the at least one flight parameter of the aircraft; and compute the flight order intended for the remote controller, by means of a computation law, as a function of the consolidated value of the at least one flight parameter of the aircraft.

12. The system according to claim 11, wherein the primary computers are of at least two types, a first type of primary computers implementing software of a first type to implement the flight order computation law and, a second type of primary computers implementing software of a second type to implement the flight order computation law, the software of the first type and the software of the second type being dissimilar.

13. The system according to claim 12, wherein the at least one flight parameter of the aircraft is a parameter of Boolean type such that a change of the consolidated value of the at least one flight parameter of the aircraft corresponds to a transition of the flight order computation law.

14. The system according to claim 13, wherein the common consolidation algorithm used by the primary computers to determine the consolidated value of the at least one flight parameter of Boolean type is configured so as to determine a consolidated value of the at least one flight parameter corresponding to a transition of the flight order computation law, when at least half the values of the at least one flight parameter of the aircraft that are used for consolidation, correspond to a transition of the flight order computation law and originate from at least one computer of the first type and from at least one computer of the second type.

* * * * *